United States Patent
Hrabal

(12) 
(10) Patent No.: US 6,616,300 B1
(45) Date of Patent: Sep. 9, 2003

(54) FLASHLIGHT ADAPTOR FOR PROVIDING ALTERNATIVE DIRECT CURRENT POWER SUPPLY TO OTHER ELECTRONIC INSTRUMENTS

(76) Inventor: Frank Hrabal, 395B Chesterfield Ct., Lakewood, NJ (US) 08701

(*) Notice: Subject to any disclaimer, the term of this patent is extended or adjusted under 35 U.S.C. 154(b) by 0 days.

(21) Appl. No.: 10/145,282
(22) Filed: May 14, 2002
(51) Int. Cl.[7] ............................................. F21V 27/00
(52) U.S. Cl. ...................... 362/258; 362/183; 362/253; 362/206; 439/638; 439/500; 320/103; 320/114
(58) Field of Search ................................ 362/195, 201, 362/202, 205, 206, 254, 258, 183, 253; 439/638, 500, 510, 507; 320/114, 107, 103; 307/66

(56) References Cited

U.S. PATENT DOCUMENTS

| | | | | |
|---|---|---|---|---|
| 3,049,669 A | * | 8/1962 | Johnston | 178/115 |
| 5,321,349 A | * | 6/1994 | Chang | 323/297 |
| 5,575,682 A | * | 11/1996 | Alexander | 439/500 |
| 5,786,106 A | * | 7/1998 | Armani | 429/98 |
| 5,876,242 A | * | 3/1999 | William | 439/500 |
| 6,045,235 A | * | 4/2000 | Hee | 362/183 |

* cited by examiner

*Primary Examiner*—Sandra O'Shea
*Assistant Examiner*—Ali Alavi
(74) *Attorney, Agent, or Firm*—Clifford G. Frayne

(57) ABSTRACT

An adaptor for a flashlight, the flashlight having a front lens housing and bulb, a power housing secured to the lens housing, the power housing having a plurality of C or D battery types in series and an end cap secured to said power house, the adaptor means in a first embodiment being a first conductor secured in a first insulator and interposed between said first battery and said bulb, a second insulating means secured about a second conductor means and secured to the end cap biasing means, said first conductor means and said second conductor means in electrical communication, a two prong, two conductor adaptor means secured through the face of the end cap and in electrical contact with the second conductor means when the end cap is secured to the power housing, the two prong, two conductor adaptor adapted to receive an electrically conducted communication means which communication means would have an appropriate plug in its opposing end for engagement with a jack on an electrical instrument having a depleted power supply.

8 Claims, 3 Drawing Sheets

FLASHLIGHT ADAPTOR FOR PROVIDING ALTERNATIVE DIRECT CURRENT POWER SUPPLY TO OTHER ELECTRONIC INSTRUMENTS

BACKGROUND OF THE INVENTION

1. Field of the Invention

The present invention relates to flashlights and in particular to flashlights using C and D type batteries, the invention being an adaptor to the flashlight that allows the flashlight batteries to provide power to other portable electronic instruments, such as cell phones, portable CD players, cameras and video cameras, when their battery supply is low or depleted.

2. Description of the Prior Art

The common flashlight has as its sole purpose the illumination of an area or space. The flashlight is a common utensil which is found in most households and is often present in an individual's personal vehicle, such as a car or boat. Still further, many professions require the carrying of a flashlight while on duty, such as a policeman, security guard, fireman or the like. A flashlight therefore is normally readily available to an individual whether at home or traveling in their own personal vehicle.

Many people now travel with a variety of other portable. electronic equipment, such as cell phones, pagers, CD players, cameras, video cameras, and electronic scheduling devices. All of these items are powered by battery. The batteries powering these other electronic instruments may be of a specialized shape or design in order to conform to the structure of the electrical instrument. Oftentimes the individual experiences a lack of power as a result of a dead battery in one or more of these electrical instruments at an inopportune time when a replacement battery or a recharge is not readily available. In those instances, the individual must forego usage of the electrical instrument until a battery change can be affected.

Applicant's adaptor for a common flashlight using C or D type batteries allows an individual access to a portable power supply to connect to the electrical instrument having a depleted power supply and utilize that electrical instrument for a period of time until the electrical instrument power supply can be replaced or recharged.

OBJECTS OF THE INVENTION

An object of the present invention is to provide for a novel adaptor means for a multi-cell flashlight so as to allow connection from the multi-cell flashlight to a battery powered electrical instrument such as a cell phone, camera or CD player, which has a depleted power supply, so as to allow for continued use of the electrical instrument.

A further object of the present invention is to provide for a novel adaptor means for a multi-cell flashlight which does not interfere with the flashlight's intended purpose.

SUMMARY OF THE INVENTION

An adaptor for a flashlight, the flashlight having a front lens housing and bulb, a power housing secured to the lens housing, the power housing having a plurality of C or D battery types in series, and an end cap secured to the power housing, the adaptor means in a first embodiment being a first conductor secured in a first insulator and interposed between the first battery and the bulb, a second insulating means secured about a second conductor means secured to the end cap spring, said first conductor means and said second conductor means in electrical communication, a two prong, two conductor adaptor means secured through the face of the end cap and in electrical contact with the second conductor means when the end cap is secured to the power housing, the two prong, two conductor adaptor adapted to receive an electrically conducted communication means which communication means would have an appropriate plug at its opposing end for engagement with a jack on an electrical instrument having a depleted power supply. The adaptor means in a second embodiment comprises a flashlight bulb housing having the bulb removed and a two prong, two conductor adaptor inserted into the housing. In this embodiment there is no modification to the end cap. In this modification the lens cap would be unscrewed, the bulb and housing would be removed and the housing having the two prong, two conductor adaptor would be inserted into the bulb receptacle. An electrically conducting communication means could then be secured to this two prong, two conductor adaptor and to the electrical instrument having the depleted power supply.

BRIEF DESCRIPTION OF THE DRAWINGS

These and other objects of the present invention will become apparent particularly when taken in light of the following illustrations wherein.

DETAILED DESCRIPTION OF THE DRAWINGS

Figure 1:
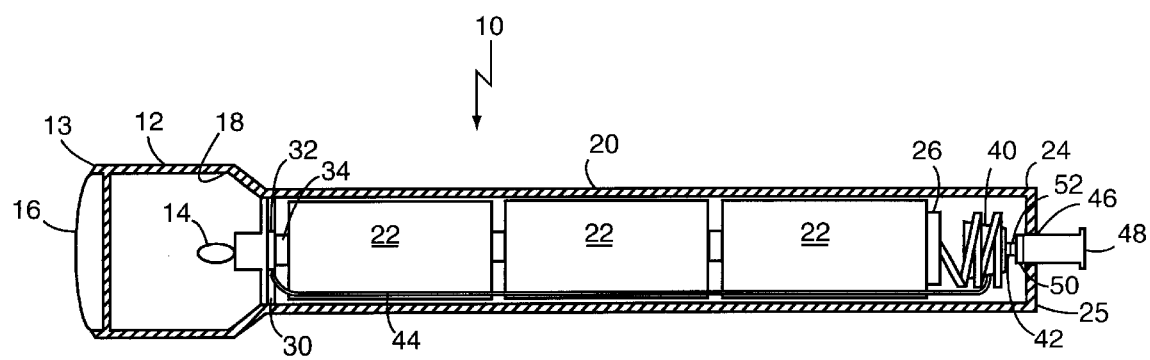
FIG. 1 is a cross sectional view of a typical multi-cell battery illustrating the adaptor means of the present invention.

FIG. 1 illustrates a typical flashlight battery 10 which is comprised of a bulb and lens housing 12 in which there is contained a light bulb 14 and a transparent lens 16. The inner wall 18 of the lens housing 12 may be coated with a reflective material to enhance the light source. The front of the lens housing 13 is normally threadedly removable. A second portion of the battery secured to the lens housing 12 is the tubular power housing 20 which as illustrated in FIG. 1, receives a plurality of batteries or power cells 22. The final portion of the battery is the end cap 24 which has associated with a biasing means 26. End cap 24 is normally threadedly engaged with the open end of the power housing 20 with the biasing means 26 serving to insure contact between each of the power cells 22 and light bulb 14 and to effectively complete the circuitry. An on/off button, not shown, is normally utilized to activate the power source in order to complete the circuitry and cause the light bulb to illuminate.

Figure 2:
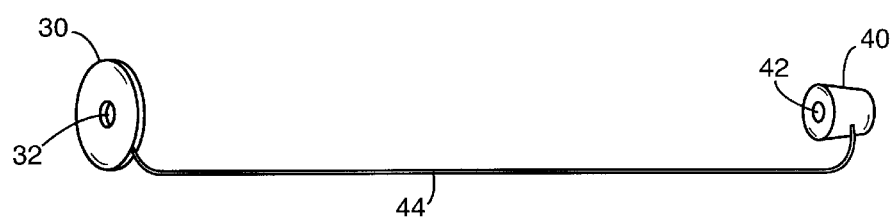
FIG. 2 is a perspective view of the adaptor means.

In FIG. 1, Applicant has adapted a standard multi-cell flashlight which utilizes either C or D size batteries so as to permit those batteries or power source to be utilized to temporarily power an electrical instrument, such as a cell phone or a portable CD player, when that particular instrument's battery or power source is either low or depleted. Applicant's adaptor means, FIG. 2, in a first embodiment has a first insulator means 30 having a first conductor means 32 positioned therethrough, the first insulator means and first conductor means are interposed between the first battery in the power housing and the light bulb 14 such that the first conductor means 32 is in communication with the positive contact 34 of the first battery and the light bulb 14.

A second insulator means 40 and second conductor means 42 positioned therethrough is secured internally by the battery retaining spring biasing means 26. This second conductor means 42 is in communication with the first conductor means 32 by means of a wire 44 within the power housing.

The end cap 24 is modified by forming a centrally disposed aperture 46 in its face plate 25 to allow for a two prong, two conductor jack 48 to be secured therein. The jack 48 is secured by means of a locking nut 50 such that when end cap 24 is threadedly secured to the power housing 20, the conductor end 52 of the jack 48 will contact second conductor means 42. The jack 48 secured to end cap 24 could be one of choice, but preferably it will be of the type designed to receive a twist and lock female mate, such as a jack.

With this configuration, the flashlight is now available to provide illumination through the operation of its on/off switch or alternatively is available to utilize the power supply of the plurality of batteries or power cells within the power housing to supply power to another electrical instrument.

Figure 5:
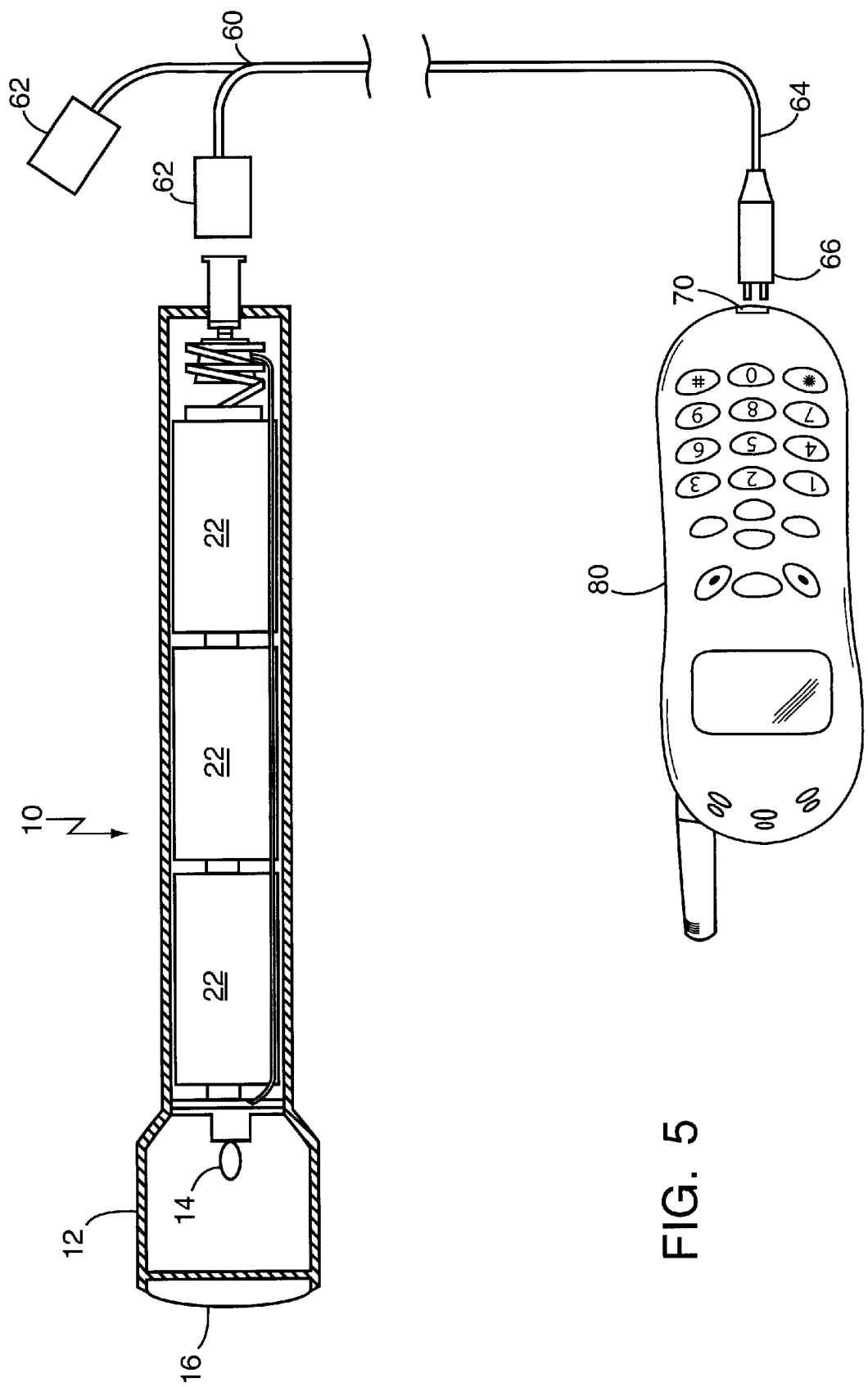
FIG. 5 is a view of FIG. 1 illustrating the connection between the flashlight and the electrical instrument requiring power.

FIG. 5 illustrates an extension cable to be utilized in conjunction with jack 48 and the flashlight 10 as modified and described. The extension cable 60 would have a twist and lock female receptacle 62 at one end for locking engagement with jack 48. The opposing end 64 of the extension cable would be fitted with a male plug 66 of a size suitable for engagement with the female receptacle recharging jack 70 of the electrical instrument 80 to which power was to be supplied. Many of these female recharge receptacles on the electrical instruments have been standardized to one type of adaptor plug, however, the opposing end 64 of extension cable 60 could be fitted with a snap on receptacle such that the individual could purchase the appropriate adaptor plug required for the appropriate electrical instrument and snap it into place at the opposing end 64 of extension cable 60.

In this configuration, if the battery shown contained three relatively new rechargeable D cell batteries, the output would be 3.6 volts at 4,500 milliamps. If the flashlight contained four D cells, the output would be 4.8 volts at 4,500 milliamps. If extension cable 60 were formed as a splitter cable with two female receptacles 62 and one opposing end and attached simultaneously to two flashlights, each containing three D cells, the output would be 7.2 volts at 4,500 milliamps. The same voltage ratings would be achieved with rechargeable C type cells or batteries in the configurations listed, but the amperage output would be 3,000 milliamps.

Figure 3:
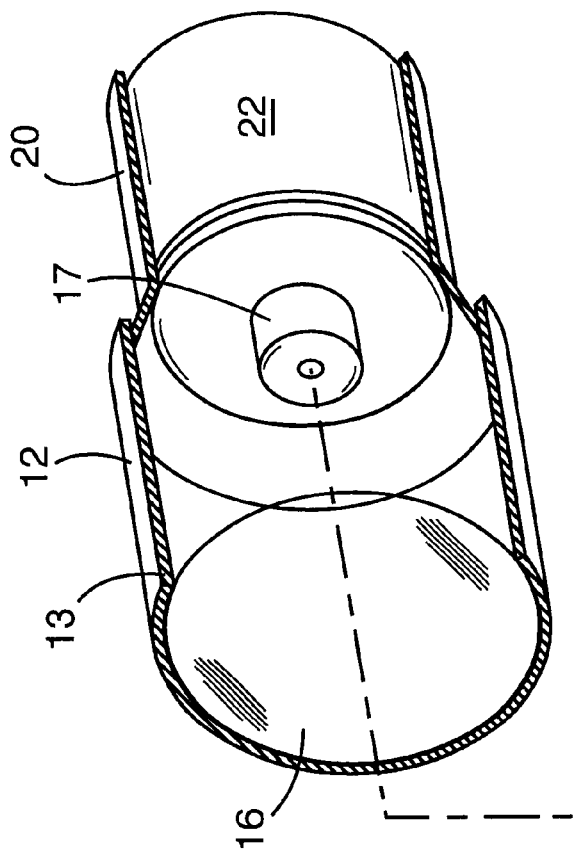
FIG. 3 is a partial cross sectional view of the lens and bulb area of a typical multi-cell battery illustrating a second embodiment of the adaptor means of the present invention.
Figure 4:
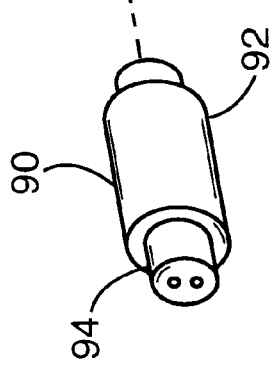
FIG. 4 is a perspective view of the two prong, two conductor adaptor for use in the bulb receptacle.

FIGS. 3 and 4 illustrate a second embodiment of Applicant's invention which will allow a flashlight to be utilized as a power source for an electrical instrument in need of power. FIG. 3 is a partial cross section of the lens area of the flashlight and FIG. 3 is a perspective of the adaptor utilized in this embodiment. The elements of the battery in this embodiment are identical to those elements described with respect to FIG. 1. In this embodiment, the front of the lens housing 13 is threadedly removed to allow access into the lens housing 12. The light bulb 14 would be removed from its mounting receptacle 17 and would be substituted with a two prong, two conductor adaptor 90. Adaptor 90 is constructed of a standard light bulb 14 in which the bulb has been removed from the shell housing 92. A two prong, two conductor adaptor 94 has been inserted into the shell housing 92 and the adaptor is then either screwed or lock turned into the mounting receptacle 17. A cable can then be connected to the two prong, two conductor adaptor with the front of the lens housing 13 removed and that cable can be connected to an electrical instrument in need of a power supply. When there is no need to supply power to an electrical instrument with depleted power supply, the standard light bulb 14 can be reinserted into the flashlight, the front of the lens housing 13 reattached and the flashlight will work in its normal manner.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. An improved flashlight with adaptor to supply power to another battery operated electrical instrument, said flashlight having a lens housing and bulb, a body member for receipt of a plurality of power cells in series, and end cap and biasing means for maintaining contact between said plurality of power cells and said light bulb, said improvement comprising:

a first insulation means formed about a first conductor means and interposed between said bulb and said power cells;

a second insulation means disposed about a second conductor means and secured in said biasing means proximate said end cap;

a two prong, two conductor adaptor positioned in an aperture in said end cap in axial alignment with said power cells and in communication with said second conductor means when said end cap is secured to said body member;

a communication means from said first conductor means through said first insulation means, through said second insulation means to said second conductor means.

2. The improved flashlight in accordance with claim 1 wherein said two prong, two conductor adaptor is removably engageable with a first end of an electrical conduit, said electrical conduit having a second end having an adaptor for connection to said battery operated electrical instrument.

3. The improved flashlight in accordance with claim 1 wherein said improved flashlight receives D size power cells.

4. The improved flashlight in accordance with claim 1 wherein said flashlight receives C size power cells.

5. The improved flashlight in accordance with claim 1 wherein said communication means from said first conduit through said first insulation means to said second insulation means and to said second conduit comprises an insulated wire.

6. The improved flashlight in accordance with claim 1 wherein said first installation means and first conductor means, and said second insulation means and second conductor means, and said communication means from said first conductor means through said first insulation means and to said second insulation means and to said second conductor means is fixedly positioned within said flashlight.

7. An adaptor for a flashlight so as to permit power to be supplied from said flashlight to other battery operated electrical instruments, the flashlight having a lens housing and bulb, a body member for receipt of a plurality of power cells in series, an end cap and a biasing means for maintaining contact between said plurality of power cells and said light bulb, said adaptor comprising a first insulation means formed about a first conductor means and interposed between said bulb and said power cells;

a second insulation means disposed about a second conductor means and secured in said biasing means proximate said end cap;

a two prong, two conductor adaptor positioned in an aperture in said end cap in axial alignment with said power cells and in communication with said second communication means when said end cap is secured to said body member; and a communication means from said first conductor means through said first insulation means, through said second insulation means to said second conductor means for supplying power to said two prong, two conductor adaptor and a means for communication between said two prong, two conductor adaptor to said other battery operated electrical instrument.

8. An improved flashlight with adaptor to supply power to other battery operated electrical instruments, said flashlight having a lens housing and bulb, a body member for receipt of a plurality of power cells and series, an end cap and biasing means for maintaining contact between said plurality of power cells and said light bulb, said improvement comprising:

a two prong, two conductor adaptor secured within a light bulb mount, said two prong, two conductor adaptor and mount being substituted for said light bulb in said lens housing, said two prong, two conductor adaptor removably receivable with a communication means for communication with said other battery operated electrical instrument.

* * * * *